(12) United States Patent  
Majumder

(10) Patent No.: US 7,664,746 B2  
(45) Date of Patent: Feb. 16, 2010

(54) PERSONALIZED SEARCH AND HEADLINES

(75) Inventor: Rangan Majumder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 11/274,536

(22) Filed: Nov. 15, 2005

(65) Prior Publication Data

US 2007/0112792 A1    May 17, 2007

(51) Int. Cl.
*G06F 17/30*    (2006.01)
(52) U.S. Cl. .............................. 707/5; 707/3
(58) Field of Classification Search ................ 707/3–7
See application file for complete search history.

(56) References Cited

U.S. PATENT DOCUMENTS

| | | | | |
|---|---|---|---|---|
| 6,012,053 | A * | 1/2000 | Pant et al. ..................... | 707/3 |
| 6,134,532 | A * | 10/2000 | Lazarus et al. ................ | 705/14 |
| 6,892,198 | B2 * | 5/2005 | Perisic et al. ................. | 707/5 |
| 6,901,398 | B1 * | 5/2005 | Horvitz et al. ................ | 707/5 |
| 6,931,399 | B2 | 8/2005 | Cheng | |
| 7,092,936 | B1 * | 8/2006 | Alonso et al. ................. | 707/3 |
| 7,162,522 | B2 * | 1/2007 | Adar et al. .................... | 709/224 |
| 7,231,419 | B1 * | 6/2007 | Gheorghe et al. ............ | 709/203 |
| 7,243,085 | B2 * | 7/2007 | Hatta ........................... | 706/12 |
| 7,293,013 | B1 * | 11/2007 | Horvitz et al. ................ | 707/2 |
| 2003/0167263 | A1 * | 9/2003 | Sasaki et al. .................. | 707/3 |
| 2004/0030996 | A1 * | 2/2004 | Van Liempd et al. ........ | 715/526 |
| 2004/0034652 | A1 * | 2/2004 | Hofmann et al. ............. | 707/102 |
| 2004/0068552 | A1 * | 4/2004 | Kotz et al. .................... | 709/218 |
| 2004/0260680 | A1 | 12/2004 | Best | |
| 2005/0055346 | A1 | 3/2005 | Perisic | |
| 2005/0102282 | A1 | 5/2005 | Linden | |
| 2005/0131887 | A1 * | 6/2005 | Rohrabaugh et al. ......... | 707/3 |
| 2005/0149502 | A1 | 7/2005 | McSherry | |
| 2005/0175160 | A1 | 8/2005 | Simpson | |
| 2005/0193335 | A1 | 9/2005 | Dorai | |
| 2005/0216434 | A1 | 9/2005 | Haveliwala | |
| 2005/0240580 | A1 * | 10/2005 | Zamir et al. .................. | 707/4 |
| 2005/0262043 | A1 * | 11/2005 | Saito ............................ | 707/1 |

FOREIGN PATENT DOCUMENTS

WO    WO0180070    10/2001
WO    WO2005098678    10/2005

OTHER PUBLICATIONS http://www.geovector.com/. Last accessed Nov. 15, 2005.
http://searchenginewatch.com/searchday/article.php/3563036. Last accessed Nov. 15, 2005.
http://searchenginewatch.com/searchday/article.php/3301481. Last accessed Nov. 15, 2005.

* cited by examiner

*Primary Examiner*—Tim T. Vo
*Assistant Examiner*—Michelle Owyang
(74) *Attorney, Agent, or Firm*—Workman Nydegger

(57) ABSTRACT

The claimed subject matter provides a system and/or a method that facilitates providing a personalized set of available content. An interface can receive a content vector associated with available content and a profile vector associated with a user preference. Additionally, a personalization component can generate a personalized set of available content by correlating the content vector and the profile vector.

20 Claims, 14 Drawing Sheets

PERSONALIZED SEARCH AND HEADLINES

BACKGROUND

Technological advances in computer hardware, software and networking have lead to efficient, cost effective computing systems (e.g., desktop computers, laptops, handhelds, cell phones, servers, . . . ) that can communicate with each other from essentially anywhere in the world in order to exchange information. These systems continue to evolve into more reliable, robust and user-friendly systems. As a consequence, more and more industries and users are purchasing computers and utilizing them as viable electronic alternatives to traditional paper and verbal media for exchanging information. For example, many industries and users are leveraging computing technology to improve efficiency and decrease cost through web-based (e.g., on-line) services. For instance, users can search and retrieve particular information (e.g., via a search engine), view headlines related to available content, purchase goods, view bank statements, invoke monetary transactions (e.g., pay a bill on-line), research products and companies, apply for employment, obtain real-time stock quotes, obtain a college degree, download files and applications, transmit correspondence (e.g., email, chat rooms, . . . ), etc. with the click of a mouse.

A user can obtain information utilizing various techniques. For instance, information can be provided to a user as one or more headlines. Pursuant to an example, a user interface can display any number of headlines related to available content and a user can select a headline of interest to obtain related content associated therewith (e.g., selecting a hyperlink related to the headline). Additionally, a user can search for information (e.g., via a search engine). In general, a search engine is a program (e.g., computer executable instructions) designed to help find files (e.g., web pages, images, text, . . . ) stored on a computer, for example, a public server or on one's own personal computer. A typical search engine allows a user to invoke a query for files that satisfy particular criteria, for example, files that contain a given word or phrase in a title or body. Web search engines generally work by storing information about a large number of web pages retrieved from the World Wide Web (WWW) through a web crawler, or an automated web browser, which follows essentially every link it locates. The contents of each web page are then analyzed to determine how it should be indexed, for example, words can be extracted from the titles, headings, or special fields called meta-tags. Data about web pages is stored in an index database for use in later queries. Some search engines store (or cache) all or part of a source page as well as information about the web pages. When a user invokes a query through the web search engine by providing key words, the web search engine looks up the index and provides a listing of web pages that best-match the criteria, usually with a short summary containing the document's title and/or parts of the text. Some web search engines employ a real-time approach, wherein information is obtained when a query is started rather than obtaining stored information through indexing. With this approach, the information is more up-to-date and there typically are less dead links and less system resources are needed, but more time is generally required to complete the request.

In general, the usefulness of a headline or a search result depends on the relevance to a user. While there can be numerous web pages that include a particular word or phrase, some web pages may be more relevant, popular, or authoritative than others. Most search engines employ methods to rank the results to provide a "best" result first. How a search engine decides which pages are the best matches, and what order the results should be shown in, varies widely from one engine to another. Conventionally, techniques for identifying a user's interests to provide relevant headlines and/or search results include explicitly asking the user to select preferred topic(s). For instance, a user can be presented with a set of potential topics and the user can select a subset of the topics to accordingly personalize headlines and/or search results. However, these techniques typically require a user to perform initialization via explicitly inputting interests and can be subject to inaccuracies if the user's interests change without the explicit input being updated.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate personalizing a set of available content. Data associated with a user's behavior can be utilized to infer logical interests, which can be leveraged to personalize the set of available content. The content can be, for instance, a document, an article, a web page, a link, a resource associated with the World Wide Web, etc. A content vector that is associated with available content and a profile vector that is associated with a user preference can be generated. For example, the content vector can be in a high dimensional vector space and can be generated utilizing metadata associated with the content. Additionally, the profile vector can be in the same vector space as the content vector and can be determined by adding, averaging, etc. content vectors associated with content with which a user has interacted. Moreover, user activity can include viewing, selecting, displaying, saving, navigating to, downloading, deleting, ignoring, emailing, printing, posting, sharing, etc. content. A personalization component can correlate the content vector and the profile vector to personalize the set of available content. The personalized set of available content can be personalized search results, personalized headlines, etc.

In accordance with various aspects of the claimed subject matter, the personalization component can correlate a number of content vectors with the profile vector. For instance, the personalization component can determine a cosine of an angle formed between the content vector(s) and the profile vector, and the content vectors associated with the largest cosine value can be identified as being most similar to the user's interests. Accordingly, the content corresponding to the most similar content vectors can be included in the personalized set of available content and/or can be displayed more visibly.

Pursuant to one or more aspects of the claimed subject matter, the profile vector can be generated by a preference modeling component that can include a user history component, a profile adaptation component, and a weighting component. The user history component can log user activity, which can thereafter be employed in connection with generating the profile vector. The profile adaptation component can control a rate at which the profile vector adapts to variations in user behavior; thus, an impact of previous user behavior can decay exponential as the user performs additional interactions. Additionally or alternatively, the profile adaptation component can ignore or equally consider past user behavior during each iteration of building the profile vector. Moreover, the weighting component can provide a weight associated with disparate types of user action, which can be employed with generation of the profile vector.

In accordance with various aspects of the innovation described herein, user behavior can be analyzed to identify content that is relevant and/or of interest to a user. Thus, the user need not explicitly provide categories of interest to enable customization to the user's preferences as is typically required by conventional techniques. Additionally, content can be weighted according to a degree of interest, as opposed to conventional techniques that filter content based on whether the content is or is not included in one or more pre-selected categories.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
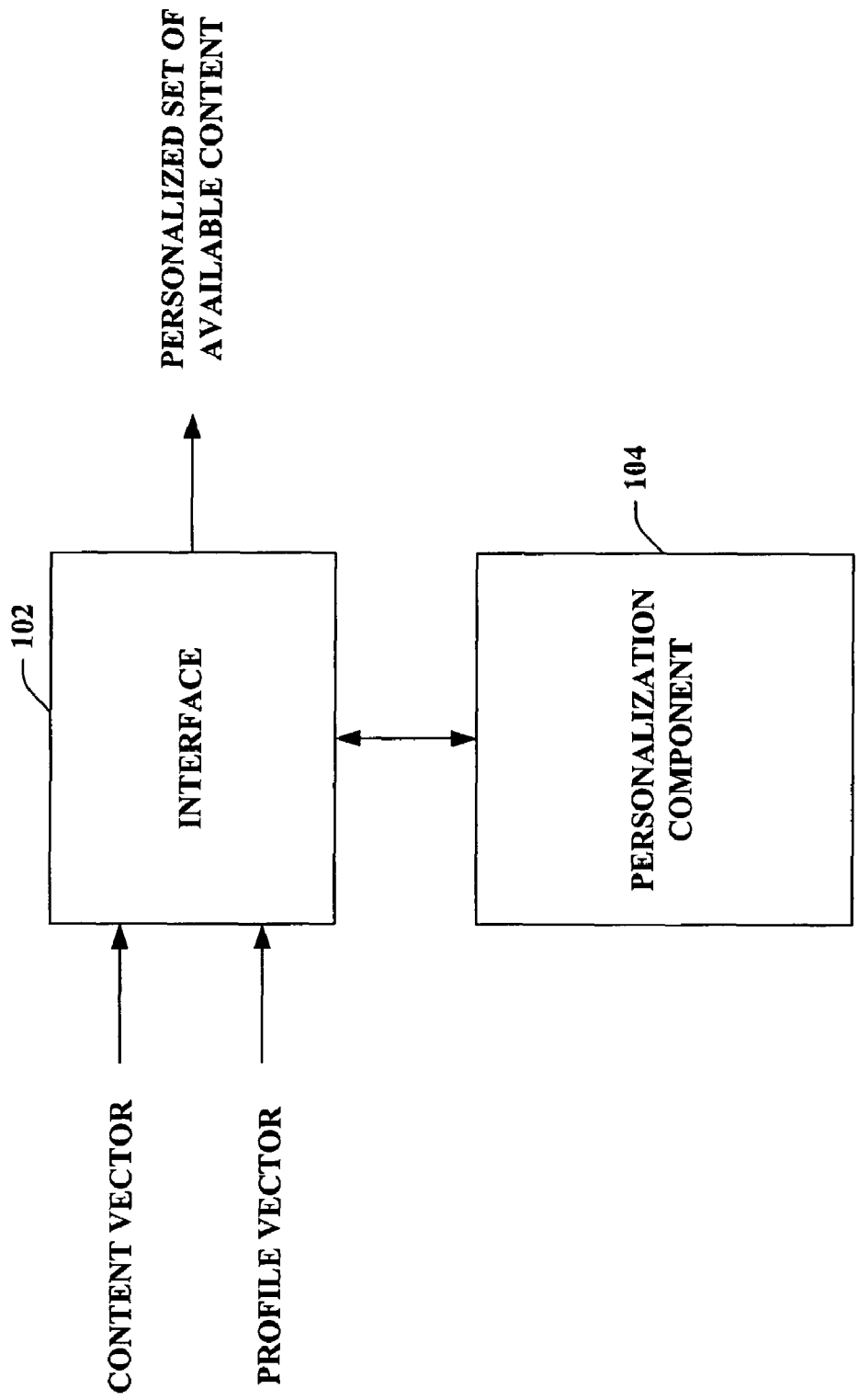
FIG. 1 illustrates a block diagram of an exemplary system that facilitates providing a personalized set of available content.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates providing a personalized set of available content. The system 100 can utilize data associated with a user's behavior to infer logical interests and leverage the inferred interests to personalize the set of available content. The system 100 includes an interface 102 that receives data related to available content and/or data related to user preferences (e.g., data associated with user history). The interface 102 provides the received data to a personalization component 104 that generates a personalized set of the available content that is similar to the user's preferences and/or identified to likely be interesting to the user. The personalized set of available content yielded by the personalization component 104 can then be communicated to the interface 102. For instance, the interface 102 can enable the personalized set of available content to be displayed, transmitted, outputted, stored, etc. According to an example, the personalized set of available content can be search engine results, headlines, etc.

The interface 102 can receive a content vector that is related to available content, for instance. The available content can be a document, an article, a web page, a link, a resource associated with the World Wide Web, etc. According to an example, the content can be associated with metadata that describes attributes and/or categories related to the content. By way of illustration, metadata associated with content can indicate that the content is related to technology, business, humor, etc.; however, the claimed subject matter is not limited to such illustration. Additionally or alternatively, the metadata that describes attributes related to the content can be assigned by a human author, generated automatically (e.g., employing a classifier, . . . ), etc. Further, the attributes can be related to categories associated with the content, based on keywords included in the content, etc. The content vector received by the interface 102 can be in a high dimensional vector space and can be associated with the metadata that is related to the content. It is to be appreciated that any number of content vectors can be obtained by the interface 102, where each of the received content vectors can be associated with respective, corresponding content.

The interface 102 can additionally receive a profile vector that is related to user preferences. The profile vector can be in a high dimensional vector space. Further, the profile vector can be associated with metadata that is related to content that a user has interacted with. For instance, the profile vector can be associated with content that is viewed, selected, displayed, saved, navigated to, downloaded, deleted, ignored, emailed, shared, printed, etc. by a user. Pursuant to an example, the interface 102 can receive a number of profile vectors, each related to a respective user. Additionally, the interface 102 can receive data that is utilized to identify a current user, thereby enabling a profile vector associated with the current user to be employed by the personalization component 104.

Although the interface 102 is depicted as being separate from the personalization component 104, it is contemplated that the personalization component 104 can include the interface 102 or a portion of thereof. For instance, the content vector and/or the profile vector can be generated by the personalization component 104 and the interface 102 can enable the personalization component 104 to utilize the content vector and/or the profile vector; however, the claimed subject matter is not so limited. Also, the interface 102 can provide various adapters, connectors, channels, communication paths, etc. to enable interaction with the personalization component 104.

The personalization component 104 obtains the content vector and/or the profile vector and generates a personalized set of available content. The personalization component 104 can analyze user behavior to identify content that is relevant and/or of interest to a user. Accordingly, the user need not explicitly provide categories of interest to enable customization to the user's preferences as is typically required with conventional techniques. The personalization component 104 also enables weighting content that is determined to be relevant to a user in addition to or rather than filtering such content. Thus, for example, if a user is interested in both technology and business, but her interest in technology is greater, the personalization component 104 can weight the content accordingly such that technology content is more visible. On the contrary, conventional techniques typically filter the content based on whether it is or is not in one or more pre-selected categories (e.g., business, technology, . . . ) and commonly do not consider a degree of interest.

Figure 2:
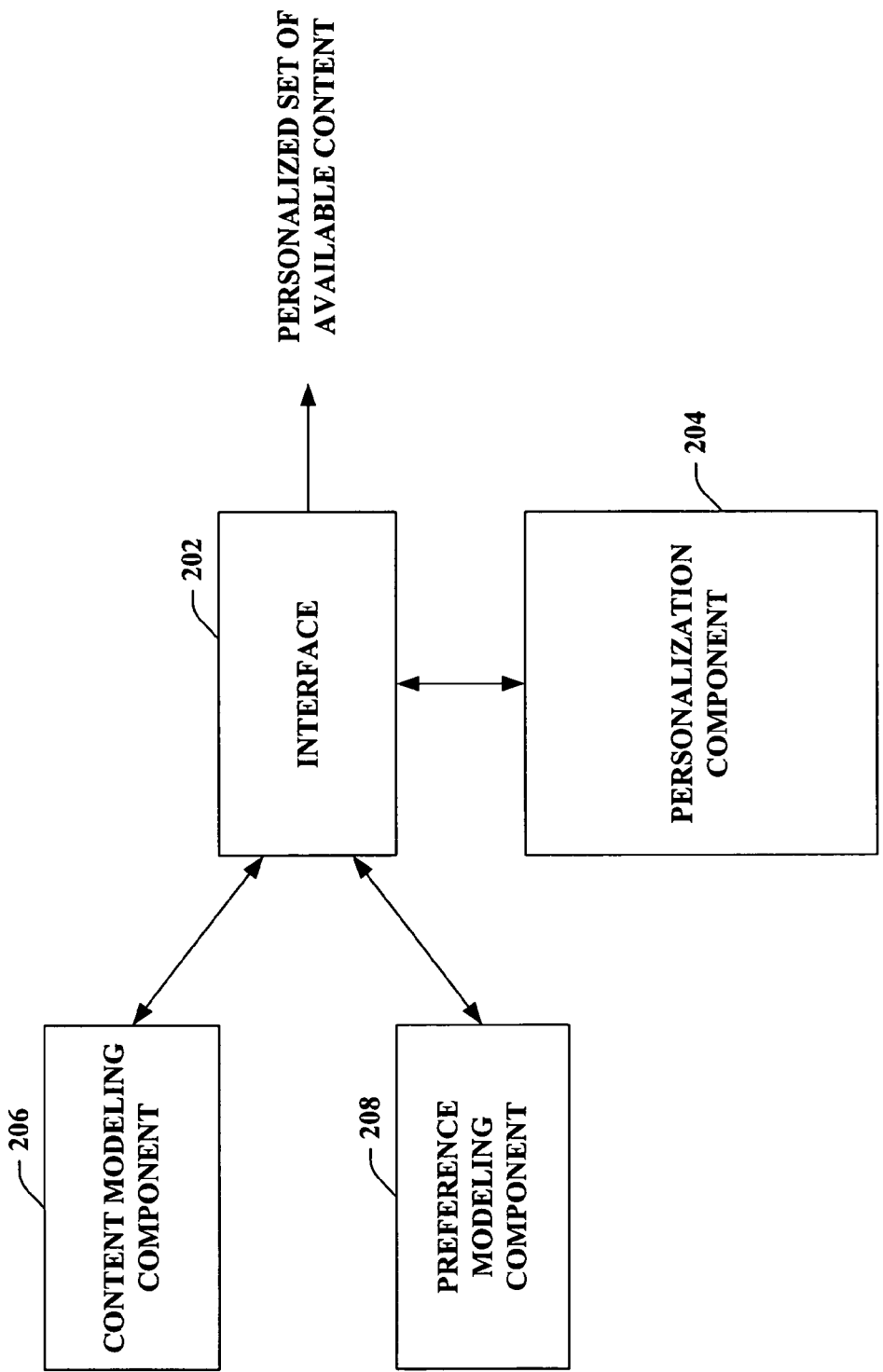
FIG. 2 illustrates a block diagram of an exemplary system that facilitates personalizing information via modeling content and/or user preferences.

The personalization component 104 can provide the personalized set, for instance, by correlating the content vector and the profile vector. According to an example, a number of content vectors, each associated with disparate content, can be obtained by the personalization component 104 via the interface 102. Pursuant to this example, the personalization component 104 can identify content vector(s) that are most similar to the profile vector associated with the user. Utilizing the content vectors identified as being similar, the personalization component 104 can select and/or include within a customized output a subset of all available content, where the subset is related to the content vectors that are similar to the profile vector. Additionally or alternatively, the personalization component 104 can facilitate ordering content such that content associated with content vector(s) that are more similar to the profile vector have a priority greater than less similar content. Accordingly, higher priority content can be displayed more noticeably than lower priority content (e.g., at a top of a list, on a earlier page, more visibly in a document, With reference to FIG. 2, illustrated is a system 200 that facilitates personalizing information via modeling content and/or user preferences. The system 200 includes an interface 202 that receives data associated with content and/or data associated with user preferences. The interface 202 can provide the data to a personalization component 204 that generates a personalized set of available content. The personalization component 204, for example, can correlate the received data to yield the personalized set of available content.

The system 200 additionally includes a content modeling component 206 that can generate a model (e.g., content vector) based on available content. The content modeling component 206 can employ metadata associated with the content to produce the model. For instance, metadata such as name-value meta-tags can describe attributes of the associated content. Pursuant to an illustration, a meta-tag associated with content can include TechnologyVers=ADO.NET; thus, the content attributed with this tag can relate to technology pertaining to ADO.NET and this information can be utilized by the content modeling component 206 in connection with modeling the content.

The content modeling component 206 an model the content as vectors in a high dimensional vector space. According to an example, content can be associated with developer languages (e.g., visual basic, C#, SQL), and the set of possible attributes included in metadata associated with the content can be DevLang=VB, DevLang=C#, and DevLang=SQL. Pursuant to this example, since there are three possible name-value combinations, the content is modeled as a three dimensional vector. Thus, in a three dimensional space such as <VB, C#, SQL>, an article that is related to C# and SQL is represented as [0,1,1] and an article that is related to visual basic is represented as [1,0,0]. It is to be appreciated that the claimed subject matter is not limited to this example; for instance, the content vectors can be N dimensional, where N is any integer, and any attribute(s) associated with content can be considered.

The system 200 also includes a preference modeling component 208 that generates a model (e.g., profile vector) associated with interests of a particular user. The preference modeling component 208 can generate a profile vector in the same vector space as a content vector (e.g., generated by the content modeling component 206). The preference modeling component 208 can generate the profile vector, for instance, by adding vectors associated with content with which the user previously interacted (e.g., viewed, stored, printed, . . . ). Thus, vector addition can be effectuated by the preference modeling component 208 via evaluating the following:

$$\vec{P}_u = \sum_{\vec{a} \in A_u} \vec{a}$$

Accordingly, $\vec{P}_u$ is the profile vector and $A_u$ is content with which the user previously interacted. Pursuant to another example, the preference modeling component 208 can generate the profile vector by utilizing vector averaging. Pursuant to this example, the preference modeling component 208 can evaluate the following:

$$\vec{P}_u = \frac{\sum_{\vec{a} \in A_u} \vec{a}}{|A_u|}$$

Thus, the profile vector $\vec{P}_u$ related to the user u is the sum of all the content with which the user previously interacted (e.g., $A_u$) divided by the number of pieces of content that were interacted with.

Pursuant to the above example with the <VB, C#, SQL>vector space, a user can read (e.g., interact with) three articles with the following attribution: C# (corresponding to a content vector of [0,1,0]), C# and SQL (corresponding to a content vector of [0,1,1]), and C# and SQL (corresponding to a content vector of [0,1,1]). Thus, the user's profile vector generated by the preference modeling component 208 is [0,3,2], which is equal to [0,1,0]+[0,1,1]+[0,1,1]. Accordingly, the user has a large affinity towards C# content, a lesser interest in SQL, and no interest in visual basic.

The personalization component 204 can employ the content vector(s) and the profile vector(s) to personalize a set of available content. Additionally, the personalization component 204 can utilize any linear algebra technique to personalize the content. The personalized set of available content can be content that is similar to the user's interests and/or content that the user is likely to find appealing.

According to an example, the personalization component 204 can determine a cosine of an angle formed between a content vector and a profile vector. The cosine of the angle between the two vectors can be between 0 (implying two orthogonal vectors and zero similarity) and 1 (implying two similar vectors, although the magnitudes can differ). The personalization component 204 can determine the similarity between a content vector and a profile vector by evaluating the following:

$$sim(i,j) = \cos(\vec{i}, \vec{j}) = \frac{\vec{i} \cdot \vec{j}}{\|\vec{i}\|_2 \times \|\vec{j}\|_2} = \frac{\sum_{m \in M}(S_{m,i} \cdot S_{m,j})}{\sqrt{\sum_{m \in M} S_{m,i}} \cdot \sqrt{\sum_{m \in M} S_{m,j}}}$$

Accordingly, sim(i,j) is the similarity between two vectors (e.g., a content vector and a profile vector). Additionally, $\vec{i}$ is a content vector, $\vec{j}$ is a profile vector related to a particular user, m is an attribute in a set of possible attributes M, $S_{m,i}$ is a magnitude of attribute m in the content vector, and $S_{m,j}$ is a magnitude of attribute m in the profile vector.

Figure 3:
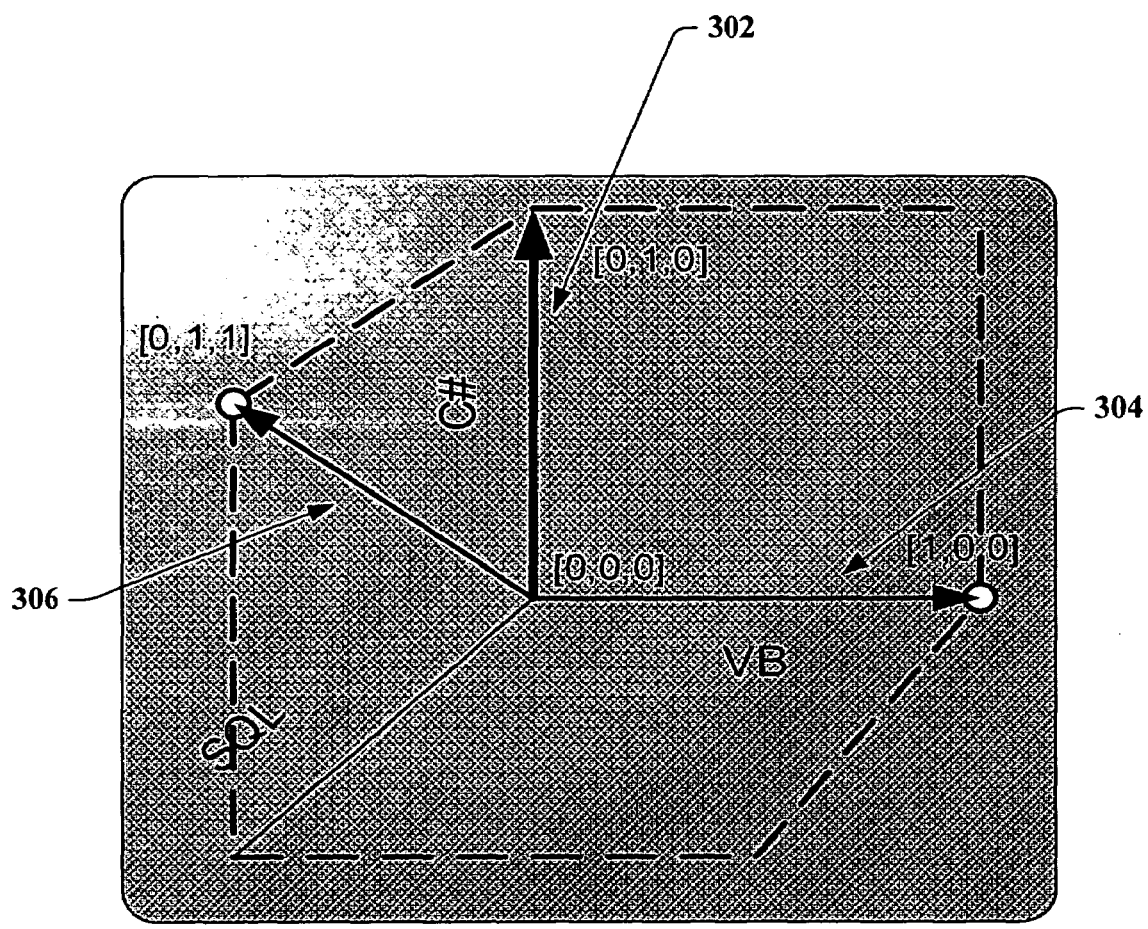
FIG. 3 illustrates an example depiction of a profile vector and content vectors.

Turning to FIG. 3, illustrated is an example depiction of a profile vector 302 and content vectors (e.g., content vector 304, content vector 306). It is to be appreciated that this depiction and related description is provided as an example and the claimed subject matter is not so limited. A three dimensional vector space (e.g., <VB, C#, SQL>) as described in the above examples is utilized in connection with this illustration. The profile vector 302, for example, can be generated by a preference modeling component (e.g., preference modeling component 208 of FIG. 2) utilizing vector addition, vector averaging, etc. According to this illustration, the profile vector 302 is [0,1,0], which indicates that the corresponding user is only interested in C# attributed content.

Two possible pieces of content can be presented to the user related to the profile vector 302 pursuant to this example. To personalize a user interface, the profile vector 302 is matched to one of the two pieces of content. A first content vector 304 (e.g., [1,0,0]) can be associated with content that purely relates to visual basic. Additionally, a second content vector 306 (e.g., [0,1,1]) can be associated with content that pertains to C# and SQL. A cosine measurement from the user's profile vector 302 to each of the content vectors (e.g., content vector 304 and content vector 306) can be effectuated (e.g., via the personalization component 204 of FIG. 2) to identify which piece of content more closely corresponds to the user's interests. The cosine measurement of the profile vector 302 to the first content vector 304 is 0 as follows:

$$\cos(\vec{P}, \vec{x}) = \frac{0+0+0}{\sqrt{0+1+0} \cdot \sqrt{0+0+1}} = \frac{0}{1} = 0$$

Additionally, the cosine measurement of the profile vector 302 to the second content vector 306 is closer to 1 as shown below:

$$\cos(\vec{P}, \vec{y}) = \frac{0+1+0}{\sqrt{0+1+0} \cdot \sqrt{0+1+1}} = \frac{\sqrt{2}}{2} \approx .707$$

Since the cosine measurement related to the second content vector 306 is closer to 1 as compared to the cosine measurement related to the first content vector 304, the content associated with the second content vector 306 is a better match to the user's interests. Accordingly, the content associated with the second content vector 306 can be included in the personalized set of content and/or be presented more visibly to a user (e.g., generated by the personalization component).

Figure 4:
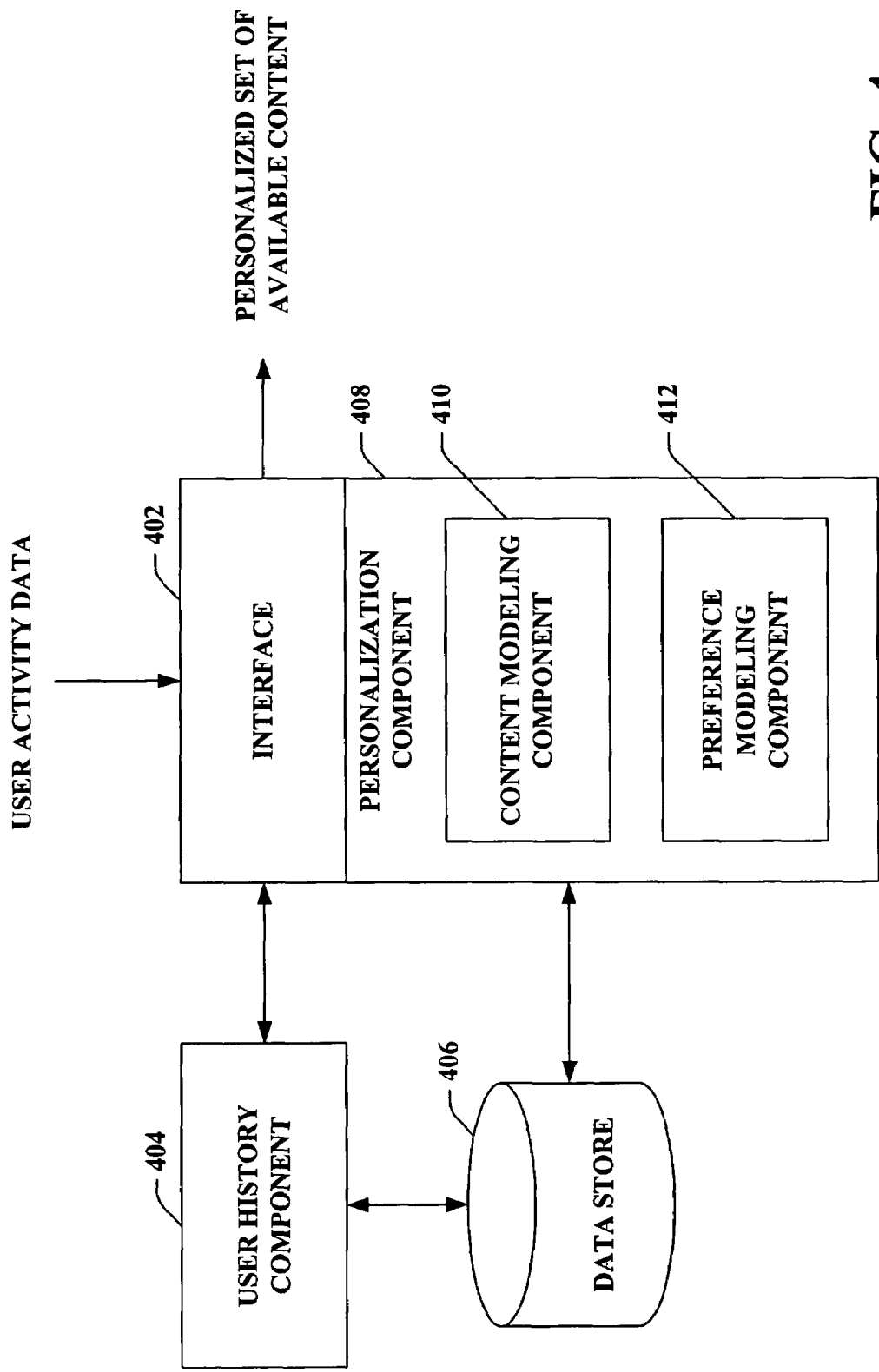
FIG. 4 illustrates a block diagram of an exemplary system that tracks user behavior to infer preferences.

Turning to FIG. 4, illustrated is a system 400 that tracks user behavior to infer preferences. The system 400 includes an interface 402 that receives user activity data that is associated with actions of a user. For instance, the user activity data can be associated with content that is viewed, saved, emailed, transferred, displayed, selected, ignored, deleted, printed, etc. by the user. Additionally or alternatively, the interface 402 can receive content that can be provided to a user. For instance, the content can be received from a search engine (not shown). The user activity data received by the interface 402 can be provided to a user history component 404 that enables the user activity data to be logged. Thus, each interaction by a user (or a number of users) can be logged by the user history component 404. Additionally, the user history component 404 can log information associated with each interaction (e.g., an amount of time that content is viewed).

The user history component 404 can store the user activity data in a data store 406. The data store 406 can provide storage for content, content vector(s), profile vector(s), user activity data, etc. The data store 406 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 406 of the subject systems and methods is intended to comprise, without being limited to, these and any other suitable types of memory. In addition, it is to be appreciated that the data store 406 can be a server, a database, a hard drive, and the like.

The data in the data store 406 can be employed by a personalization component 408 that generates personalized set(s) of available content. The personalization component 408 can comprise a content modeling component 410 that generates a model (e.g., content vector) related to content that is available. The content modeling component 410 can provide a model for content that is received via the interface 402. Additionally or alternatively, content can be included in the data store 406 and the content modeling component 410 can produce a corresponding model.

The personalization component 408 additionally includes a preference modeling component 412 that generates a model (e.g., profile vector) associated with user preferences, interests, previous behavior, etc. The preference modeling component 412 can employ the user activity data logged in the data store 406 via the user history component 404 to produce a profile vector associated with a corresponding user. Pursuant to an example, the user history component 404 can continuously monitor user behavior, and thus, the profile vector generated by the preference modeling component 412 can be dynamically modified according to changes in user activity.

The personalization component 408 can utilize the data generated by the content modeling component 410 and the data generated by the preference modeling component 412 to personalize a set of available content. For instance, the personalization component 408 can correlate content vector(s) with profile vector(s) to identify content that is similar to a user's inferred preference. Additionally, the personalization component 408 can consider a degree of interest associated with various attributes associated with content.

Figure 5:
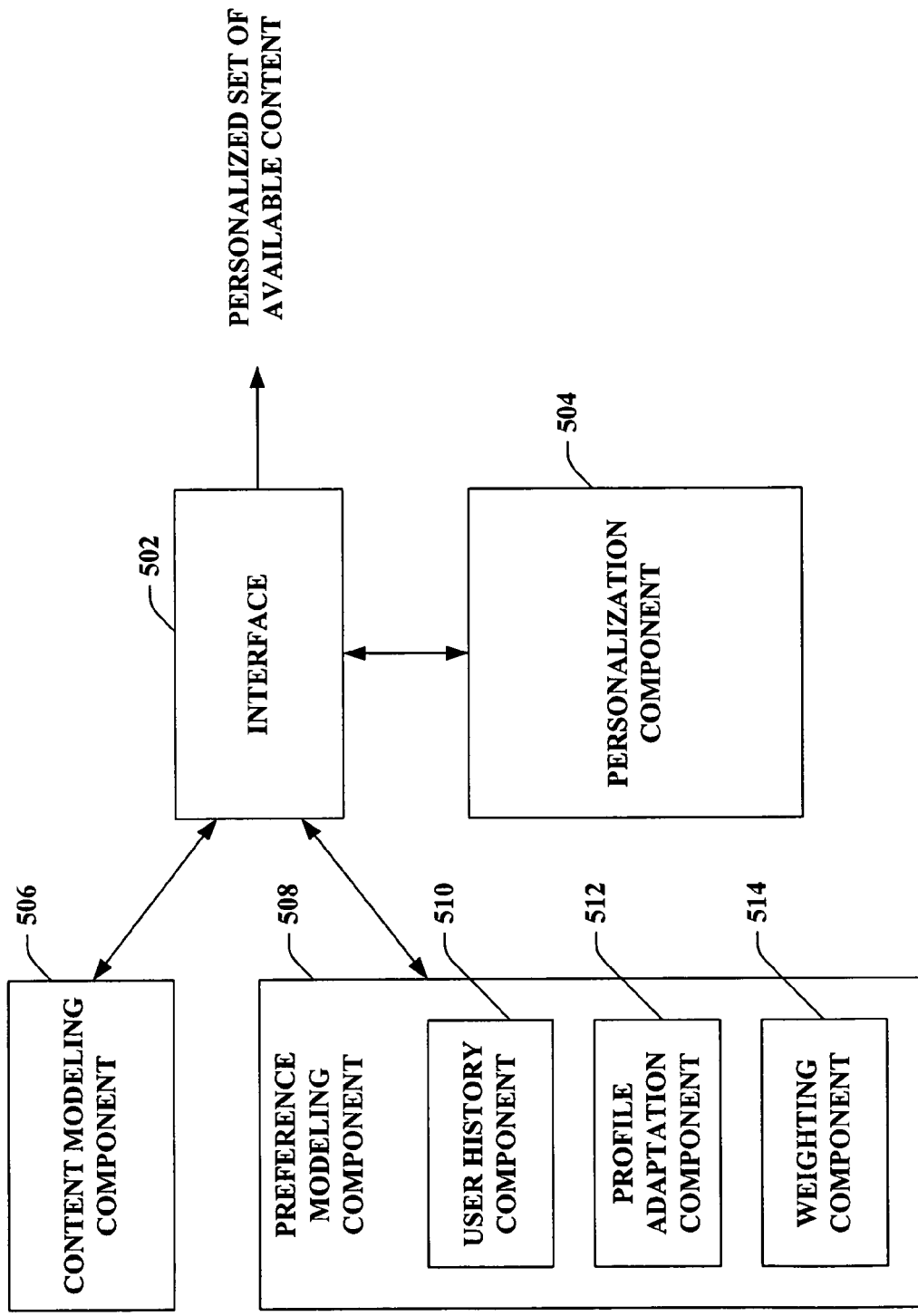
FIG. 5 illustrates a block diagram of an exemplary system that facilitates updating user preferences associated with generating a personalized set of available content.

With reference to FIG. 5, illustrated is a system 500 that facilitates updating user preferences associated with generating a personalized set of available content. The system 500 includes an interface 502 that is coupled to a personalization component 504. The personalization component 504 can generate the personalized set of available content, for example, based at least in part on data received via the interface 502 from a content modeling component 506 and/or a preference modeling component 508. The content modeling component 506 can generate a model and/or a vector associated with content. For instance, available content and/or previously viewed content can be modeled by the content modeling component 506. According to an example, the content modeling component 506 can generate a content model associated with respective content that is received and/or available (e.g., can be displayed, transmitted, provided, etc. to a user).

The preference modeling component 508 can generate a model associated with user preferences. For example, the model can be a profile vector which is associated with metadata related to content that has previously been interacted with by a user. The preference modeling component 508 can further include a user history component 510 that facilitates logging user interactions, a profile adaptation component 512 that enables modifying the profile vector associated with a user based on recent variations in user interactions, and a weighting component 514 that weights various user actions.

The user history component 510 enables storing user actions. For example, the user history component 510 can log a type of action (e.g., viewing, storing, emailing, deleting, selecting, printing, . . . ), a time when the action occurred, data associated with content interacted with (e.g., content vector, content, . . . ), etc. It is to be appreciated that the user history component 510 can log user activity data for any number of users.

The profile adaptation component 512 can control a rate that the profile vector generated by the preference modeling component 508 adapts to variations in attributes associated with content interacted with by a user. Additionally, the profile adaptation component 512 can provide a weight related to content with which the user previously interacted as a function of time, where the weight is employed in connection with generating the profile vector. The profile vector can be generated by the preference modeling component 508 iteratively such that during each iteration the profile vector can be updated with interactions recently performed. The preference modeling component 508 can build the profile vector as follows:

$$\vec{P}_i = \alpha \vec{P}_{i-1} + \beta \vec{x}$$

$\vec{P}$ is the profile vector and the attribution of the action performed is represented in $\vec{x}$. Additionally, α is an adapting rate (e.g., that can be controlled by the profile adaptation component 512) and β is a weighting factor (e.g., that can be controlled by the weighting component 514) of an action which is used to weight the user's action.

The profile adaptation component 512 can utilize an adapting rate that is a scalar (e.g., $0 \leq \alpha \leq 1$). The adapting rate can be employed to control how quickly a profile vector adapts. According to an example, a user who is primarily a C# developer and has been using the system 500 for a few months begins a visual basic project. As the user begins browsing for visual basic articles, the profile adaptation component 512 adapts to provide the user with a visual basic view (e.g., associated with the personalized set of available content). When the user completes the visual basic project and resumes C# work, the profile adaptation component 512 readapts. The readapting from visual basic to C# can be faster than the adapting from C# to visual basic since the user's past mostly includes C# interactions. It is to be appreciated that the claimed subject matter is not limited to this example.

Utilization of the profile adaptation component 512 to set α=0 can enable profile building that is completely adaptive, and thus past interactions are not considered. Employing α=1 with the profile adaptation component 512 can enable past interactions to be equally as important as current interactions, and therefore, the building of the profile is not very adaptive. The impact (I) of a particular interaction x on a profile vector can exponentially decay as the user performs additional actions. The exponential decay can be as follows:

$$I = \alpha^{i-1} \cdot \beta \cdot x$$

The weighting component 514 can control a weighting factor that is a scalar (e.g., $0 \leq \beta$). The weighting component 514 can determine the weighting factor to identify an importance of a current action. For example, the weighting component 514 can weight viewing a page as β=1, printing a page as β=2, and contributing to a news group as β=5. However, the claimed subject matter is not limited to this example.

Figure 6:
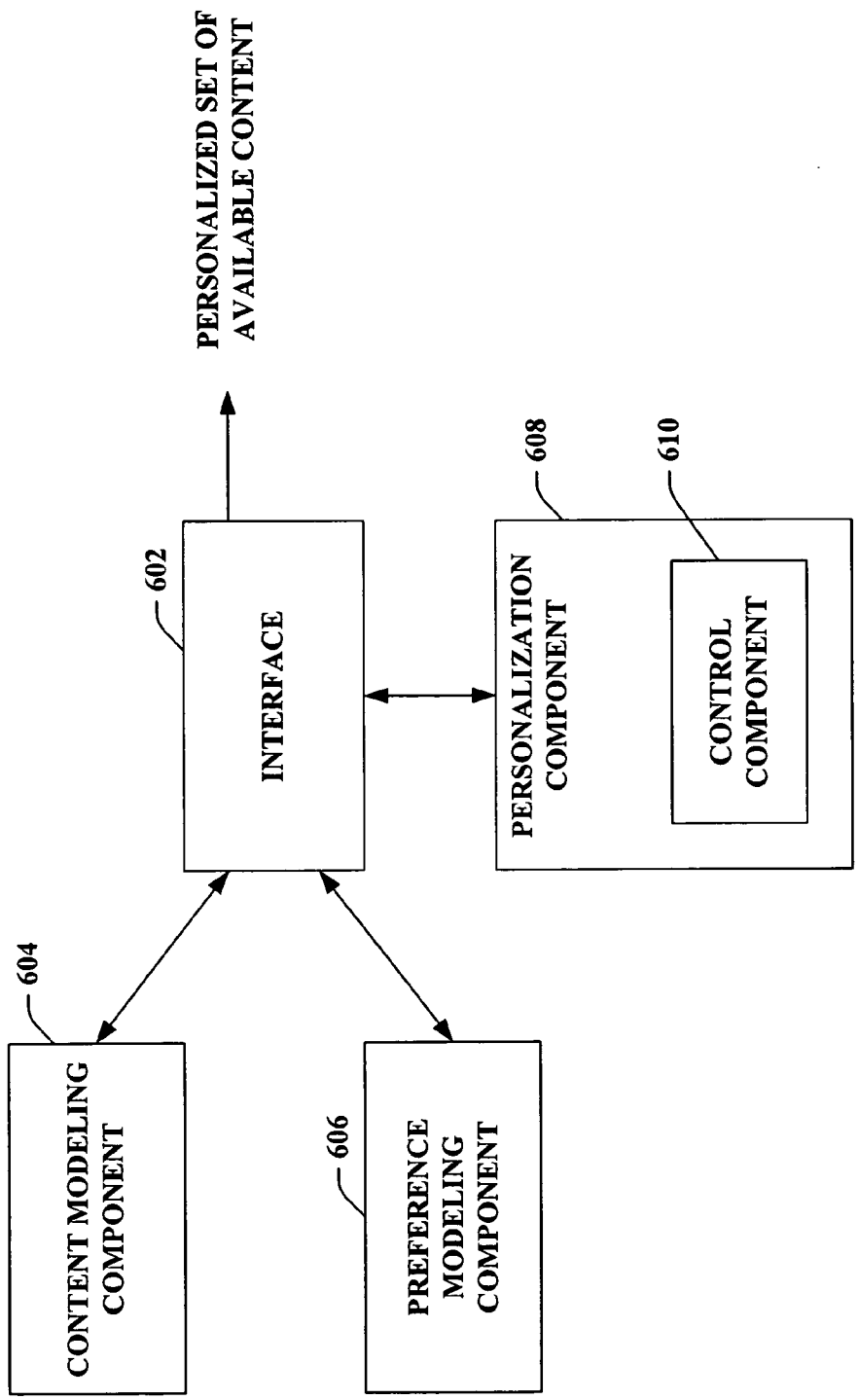
FIG. 6 illustrates a block diagram of an exemplary system that controls a degree of personalization of a set of available content.

Turning to FIG. 6, illustrated is a system 600 that controls a degree of personalization of a set of available content. The system 600 includes an interface 602 that receives content vector(s) from a content modeling component 604 and/or profile vector(s) from a preference modeling component 606. The interface 602 can provide the vectors to a personalization component 608 that can correlate content vector(s) and profile vector(s) to identify content that is likely to be interesting to a corresponding user.

The personalization component 608 further comprises a control component 610 that provides an adjustable degree to which the personalization component utilizes the user preference for generating the personalized set of available content. The control component 610 can enable a user to choose a balance between relevance related to a query and relevance related to a user's profile. For instance, the control component 610 can enable a user to input that user preferences should not be considered in connection with generating a personalized set of available content. Accordingly, for example, search results yielded from a search engine and/or headlines can be provided to the user (e.g., via a user interface) without any further personalization. Additionally, the control component 610 can enable a user to input that the personalized set of available content should also consider the user's preferences. Pursuant to an example, the control component 610 can be associated with a slider, dial, button, percentage, etc. that controls a degree of personalization.

Figure 7:
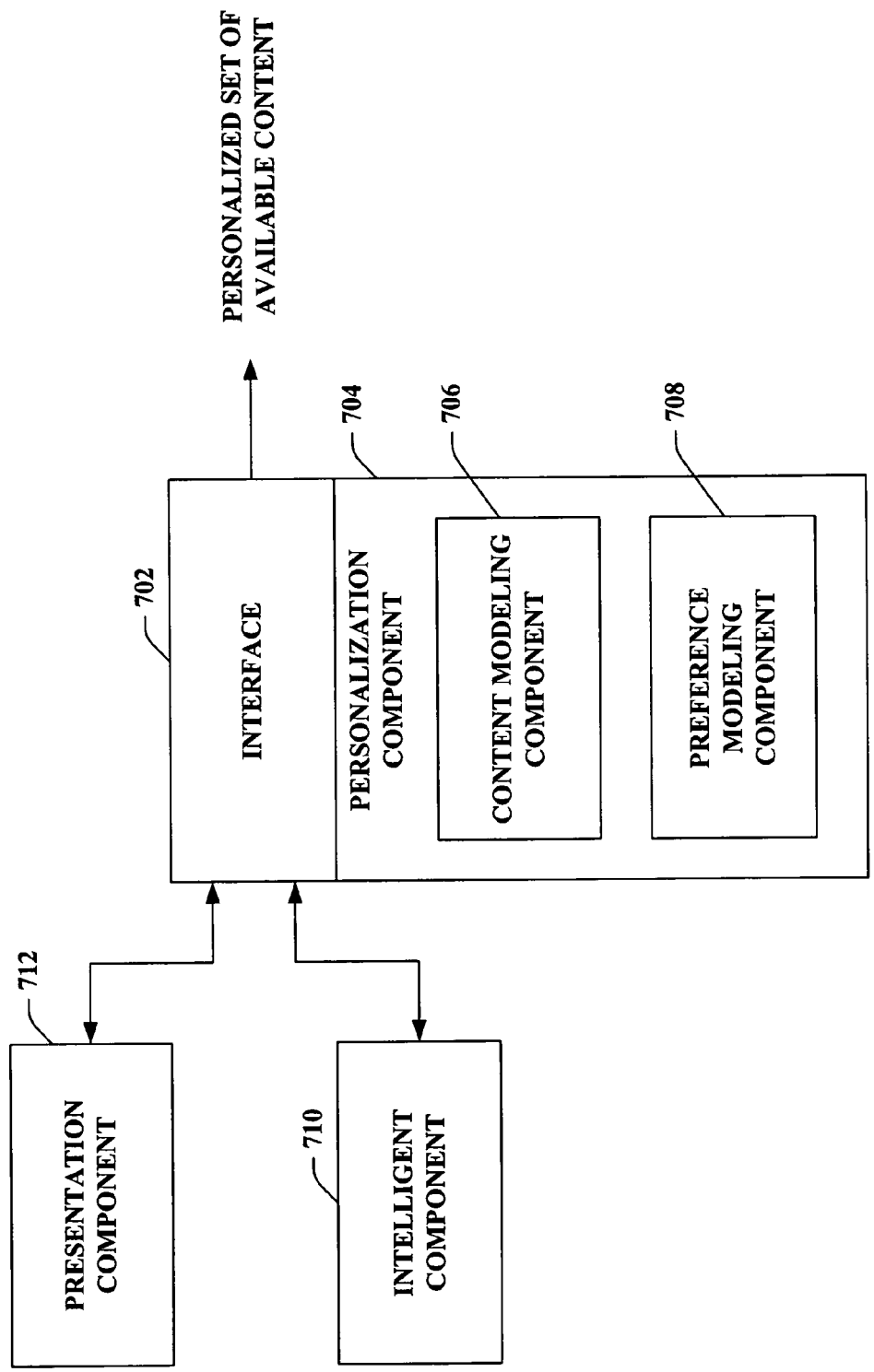
FIG. 7 illustrates a block diagram of an exemplary system that facilitates generating a personalized set of available content.

Turning to FIG. 7, illustrated is a system 700 that facilitates generating a personalized set of available content. The system 700 can include an interface 702 and a personalization component 704 that can further include a content modeling component 706 and a preference modeling component 708, all of which can be substantially similar to respective components described above. The system 700 further includes an intelligent component 710. The intelligent component 710 can be utilized by the personalization component 704 to facilitate generating and/or correlating models associated with content and models associated with user preferences. For example, the intelligent component 710 can infer a user's interests (e.g., based at least in part on user history, actions of disparate users, attributes associated with content with which a user has interacted, . . . ). Pursuant to another illustration, the intelligent component 710 can be utilized to identify attributes associated with content. For instance, the intelligent component 710 can evaluate a number of times a keyword is utilized in connection with content (e.g., via employing statistical analysis, . . . ). Further, the number of times a keyword is associated with content can be utilized as a length of a vector (e.g., content vector) in a corresponding dimension.

It is to be understood that the intelligent component 710 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 712 can provide various types of user interfaces to facilitate interaction between a user and any component coupled to the personalization component 704. As depicted, the presentation component 712 is a separate entity that can be utilized with the personalization component 704 via the interface 702. However, it is to be appreciated that the presentation component 712 and/or similar view components can be incorporated into the personalization component 704 and/or a stand-alone unit. The presentation component 712 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the personalization component 704.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
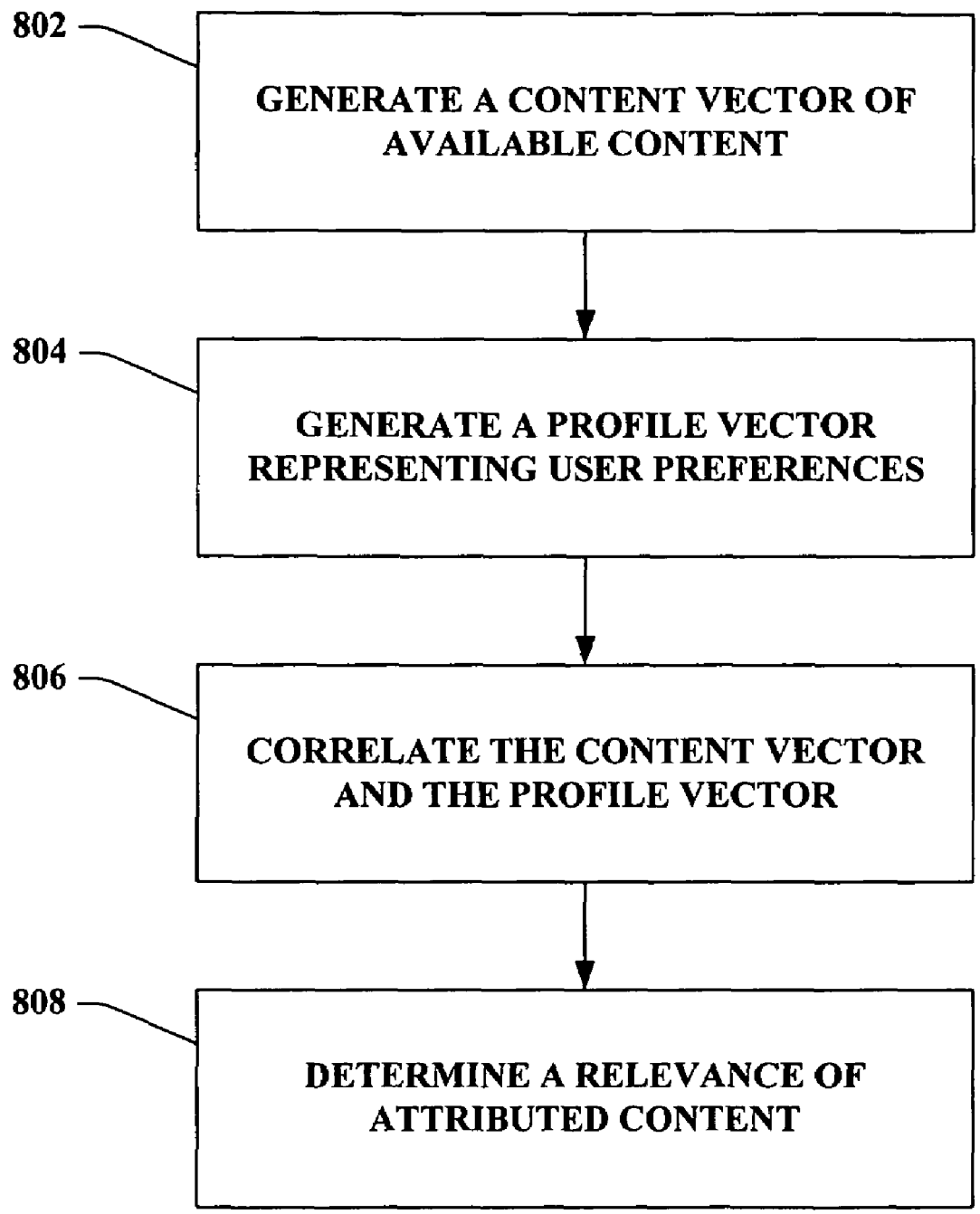
FIG. 8 illustrates an exemplary methodology that facilitates personalizing a set of available content.
Figure 9:
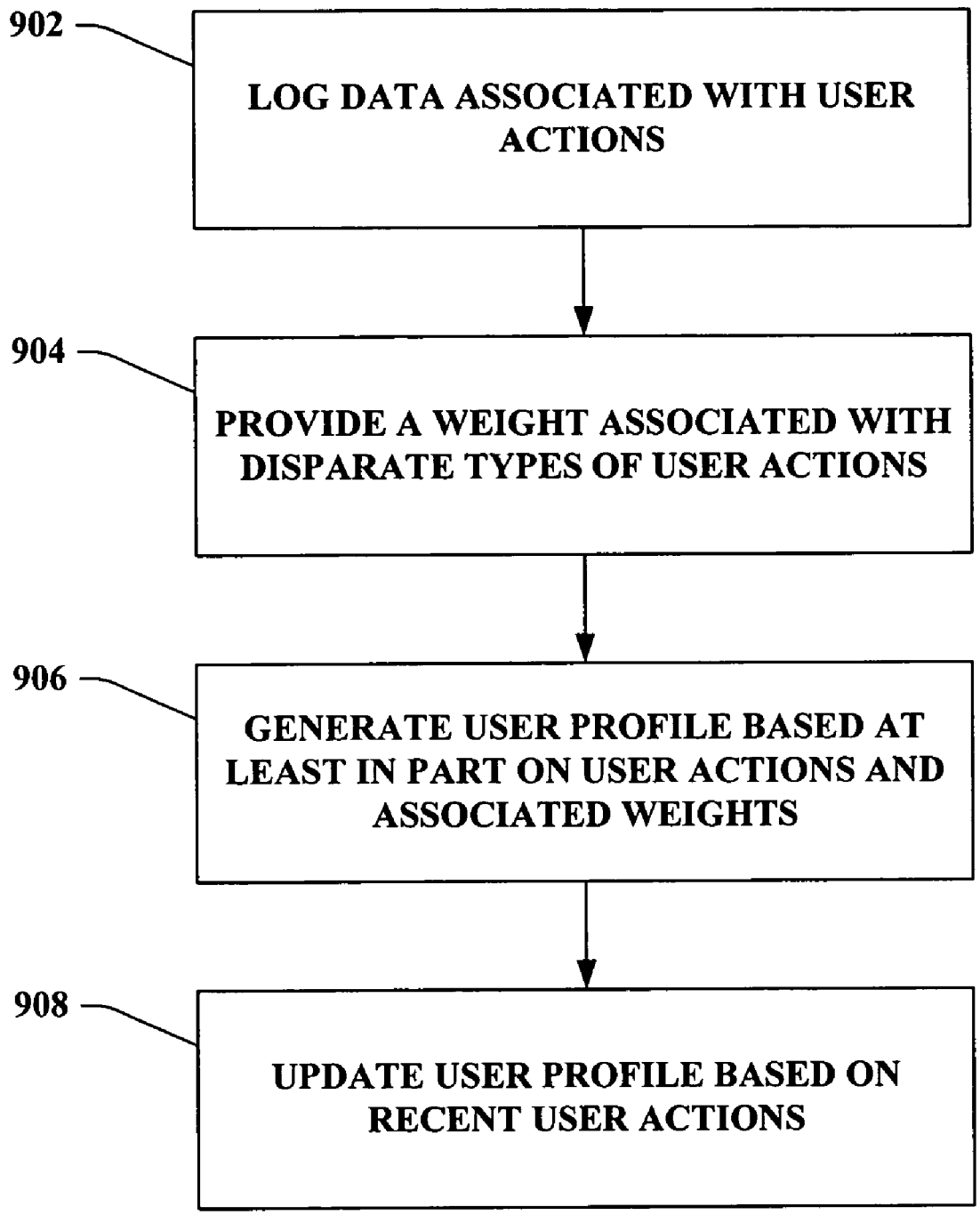
FIG. 9 illustrates an exemplary methodology that facilitates generating a profile vector that can be employed in connection with personalizing a set of available content.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a method that facilitates personalizing a set of available content. At 802, a content vector associated with available content is generated. For instance, the content vector can be generated via utilizing attributes related to the content. The attributes can be included in metadata associated with the content and any number of attributes can be employed while generating the content vector. The content vector can be in a high dimensional vector space. At 804, a profile vector representing user preferences is generated. The profile vector can be produced, for instance, utilizing vector addition, vector averaging, etc. of content vectors related to content with which a user previously interacted. The profile vector can be in the same vector space as the content vector. At 806, the content vector(s) and the profile vector(s) are correlated. Pursuant to an example, a number of content vectors, each related to respective pieces of content, can be correlated to a profile vector associated with a user. A cosine measurement can be performed to determine the correlation between two vectors (e.g., one of the content vectors and one of the profile vectors). At 808, a relevance of attributed content is determined. The content vector(s) most similar to the profile vector can be included in the personalized set of available content, for instance. Thus, the content vector with the largest associated cosine measurement can be identified as being most relevant to the user.

Turning to FIG. 9, illustrated is a method that facilitates generating a profile vector that can be employed in connection with personalizing a set of available content. At 902, data associated with user actions is logged. For example, a type of action (e.g., select, view, print, email, . . . ) can be stored along with data associated with the content (e.g., content vector). At 904, a weight associated with the type of user action can be provided. Thus, a disparate weight can be assigned to selecting content as compared to printing content; however, the claimed subject matter is not so limited. At 906, a user profile (e.g., profile vector) is generated based at least in part on the user actions and the associated weights. For instance, content vectors that are logged can be weighted and added and/or averaged. At 908, the user profile (e.g., profile vector) is updated based on recent user actions. Thus, the user profile can adapt to variations in user behavior to enable providing accurate personalized results (e.g., via correlating the user profile to available content).

Figure 10:
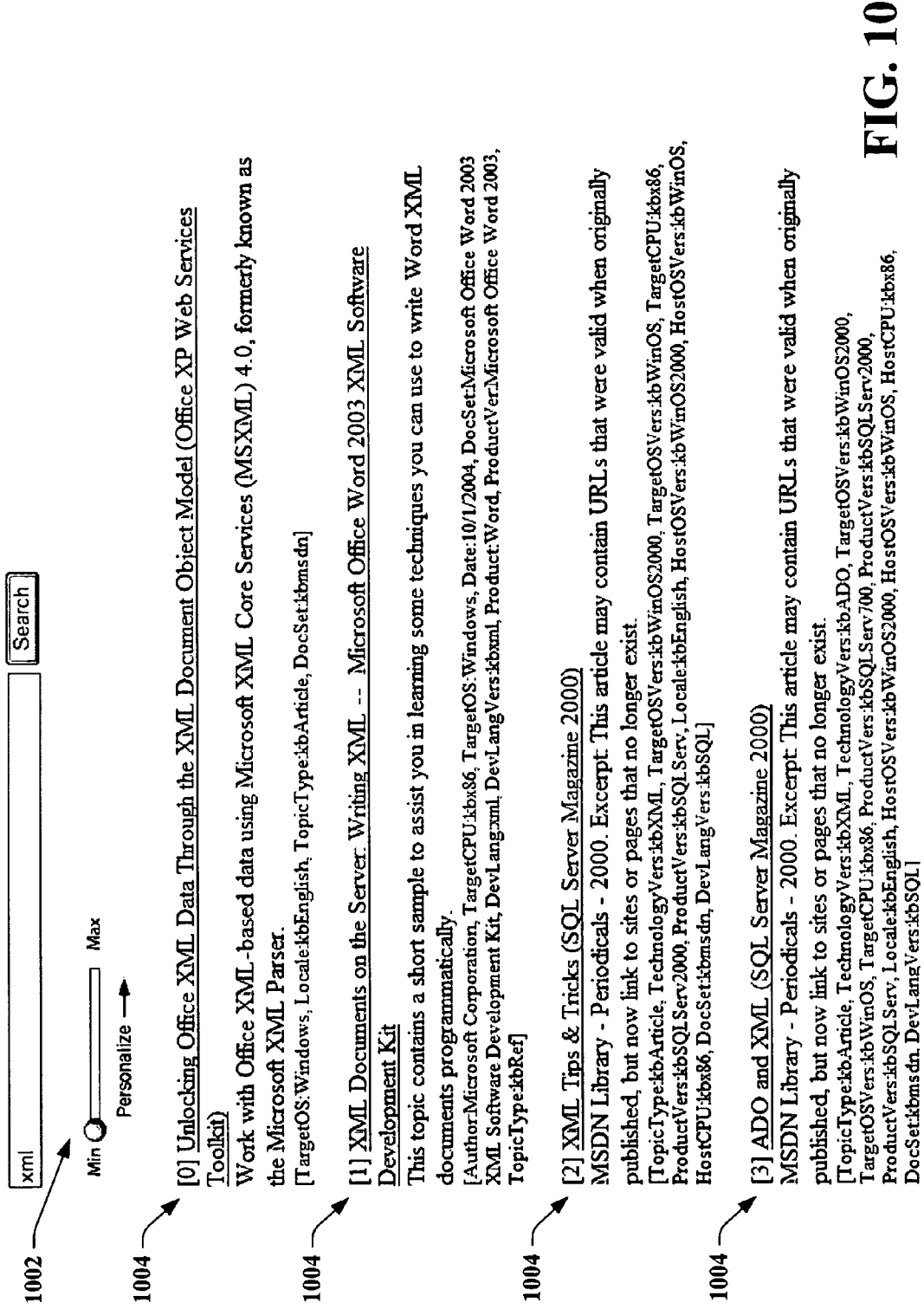
FIGS. 10-12 illustrate exemplary screen shots depicting various aspects associated with personalization of search results.
Figure 11:
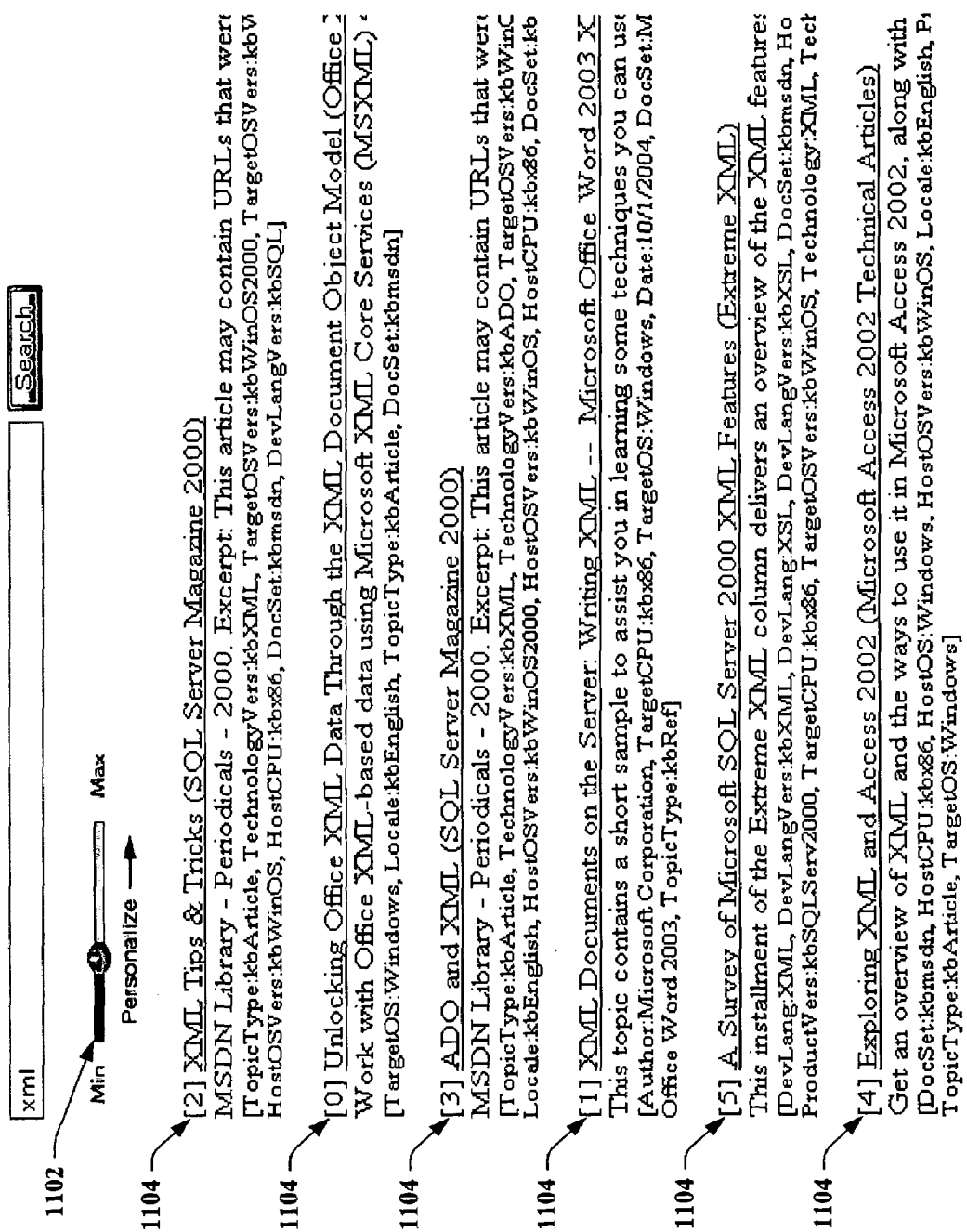
Figure 12:
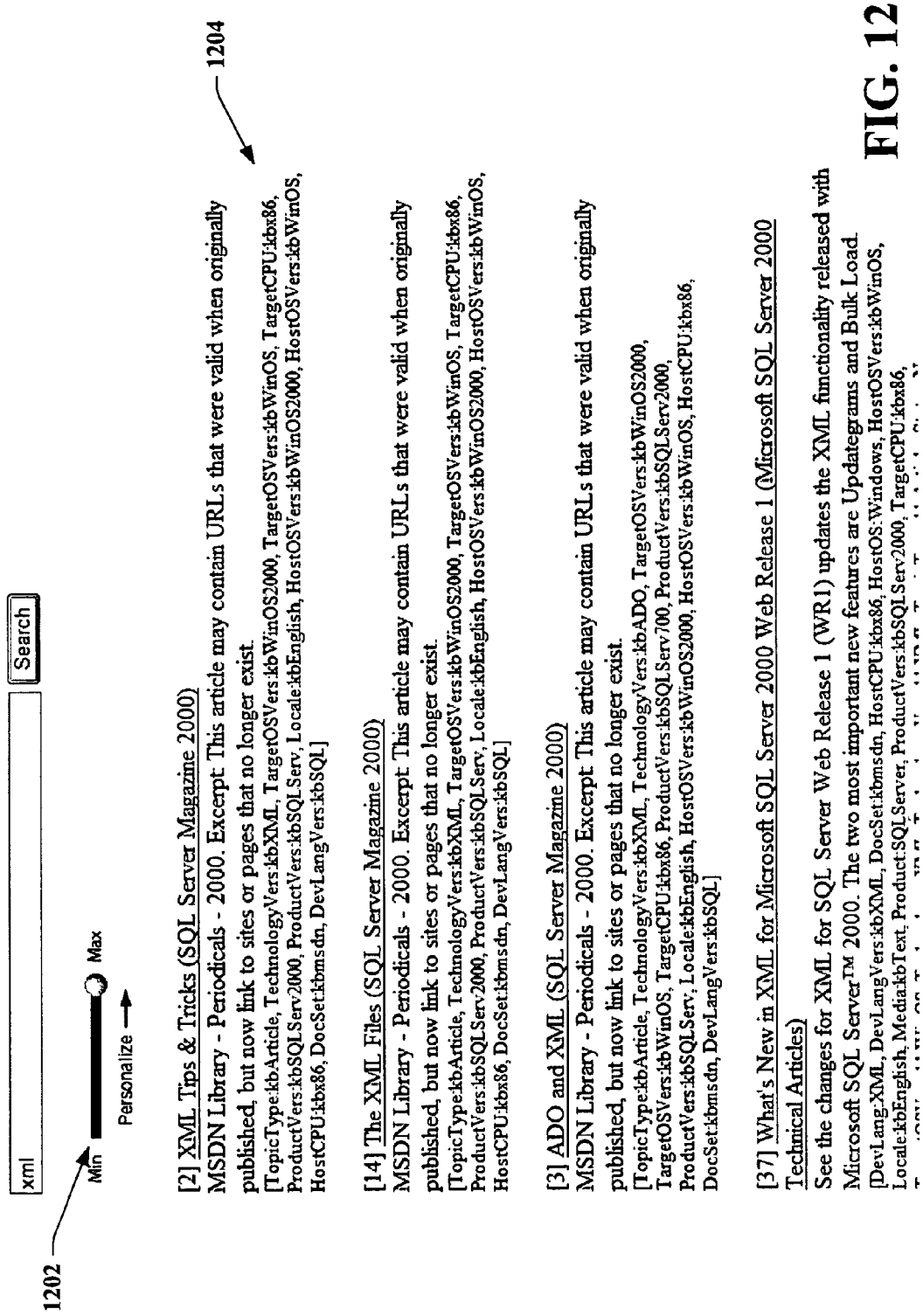

With reference to FIGS. 10-12, illustrated are exemplary screen shots depicting various aspects associated with personalization of search results. It is to be appreciated that headlines can additionally or alternatively be personalized, as well as disparate types of content. FIG. 10 illustrates a screen shot 1000 of un-personalized search results related to XML for a user that is interested in SQL. A slider bar 1002 (e.g., which can be associated with the control component 610 of FIG. 6) is set to a minimum amount of personalization. Accordingly, the search results are ranked in an order of relevance to the query (as indicated by query relevance 1004 shown in order from 0 to 3).

Turning to FIG. 11, illustrated is a screen shot 1100 of a search result related to XML for a user that is interested in SQL. A slider bar 1102 is set in between a minimum and maximum amount of personalization. Thus, the order of the search results displayed is not in the order of relevance to the query (as depicted by query relevance 1104, which is in the following order: 2, 0, 3, 1, 5, and 4). Instead, some content related to SQL is positioned ahead of content not related to SQL.

With reference to FIG. 12, illustrated is a screen shot 1200 of a search result related to XML for a user that is interested in SQL. A slider bar 1202 is set to a maximum amount of personalization. The personalization can utilize attributes 1204 associated with the search results to model the content. Additionally, the results are order such that the SQL related content is ahead of non-SQL related content.

Figure 13:
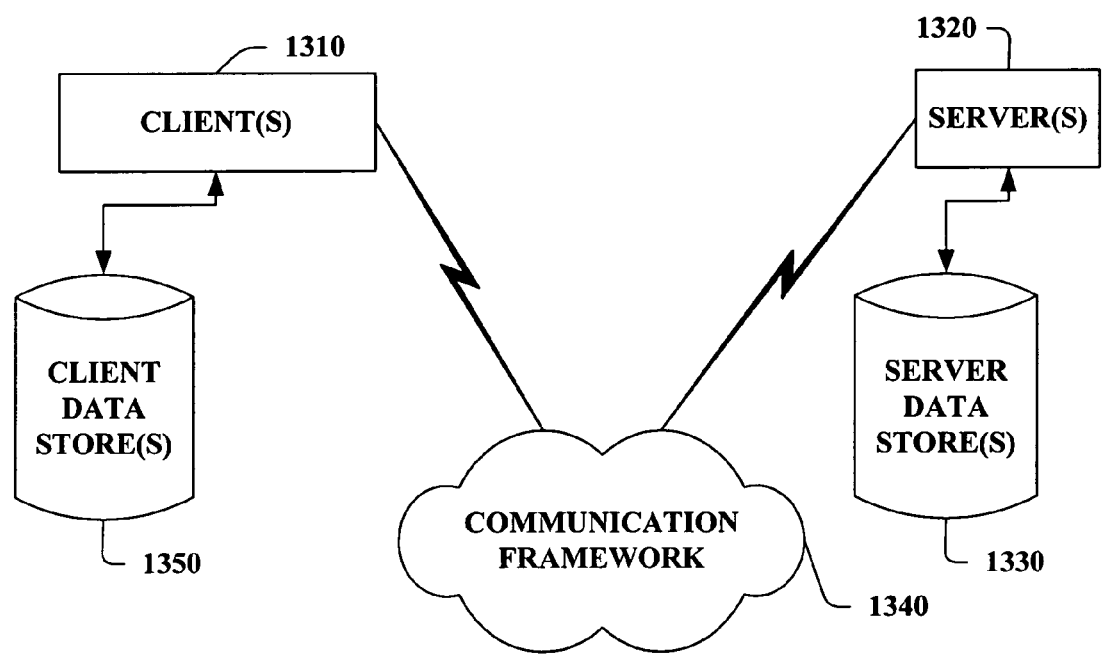
FIG. 13 illustrates an exemplary networking environment, wherein the novel aspects of the claimed subject matter can be employed.
Figure 14:
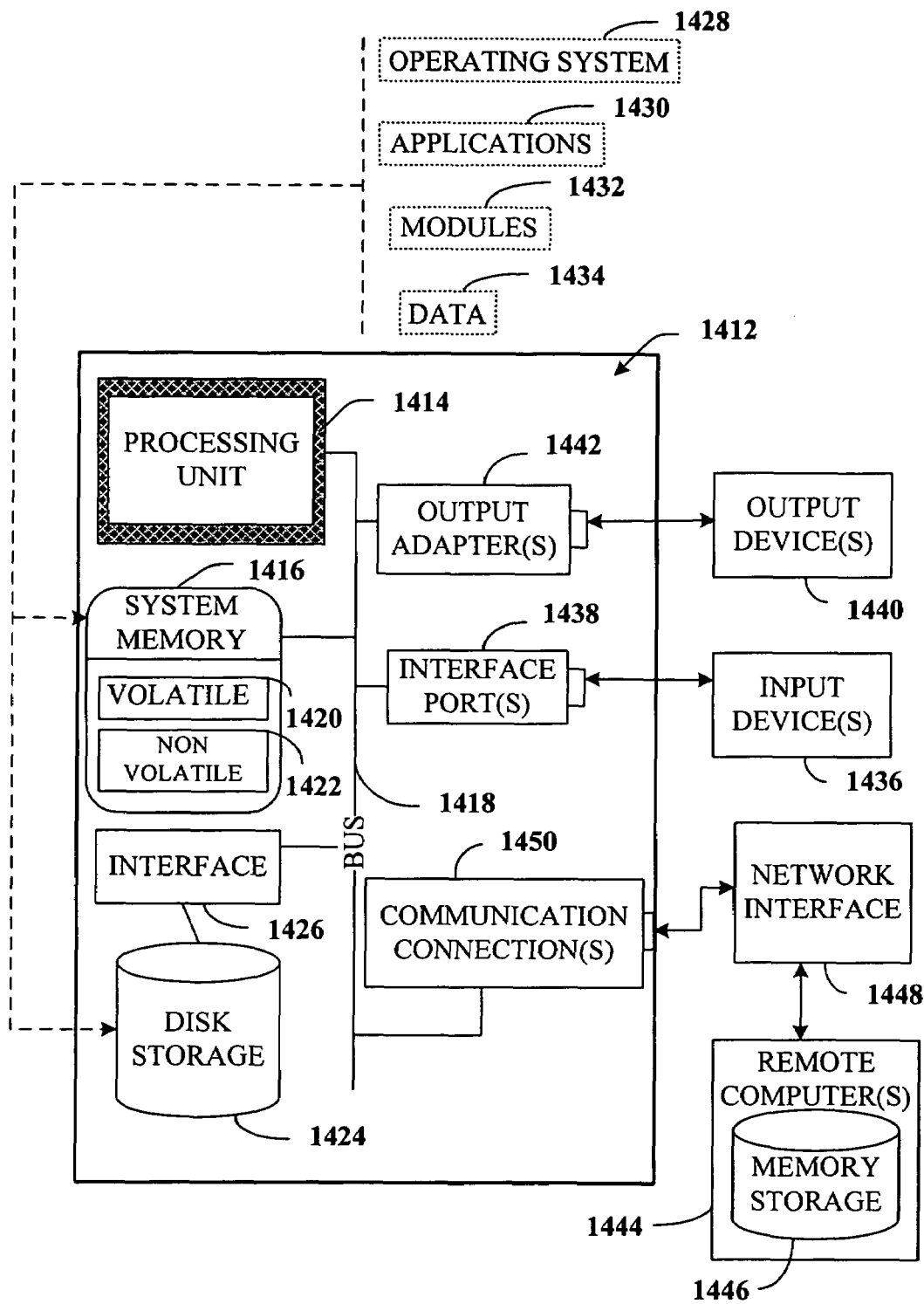
FIG. 14 illustrates an exemplary operating environment that can be employed in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s)

1310. Similarly, the server(s) 1320 are operably connected to one or more server data store(s) 1330 that can be employed to store information local to the servers 1320.

With reference to FIG. 14, an exemplary environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that facilitates providing a personalized set of available content, comprising:
    a processor coupled to a memory, wherein the processor executes the following components stored in the memory:
    an interface that receives a plurality of content vectors associated with available content and a profile vector associated with a user preference, the content vectors are high-dimensional vectors generated based upon associated metadata that describes at least one category related to the available content such that each vector dimension corresponds to a metadata category, wherein the profile vector is provided in a same high-dimensional vector space as the content vector and related to content previously interacted with by a user; and
    a personalization component that generates a personalized set of the available content by correlating the content vectors and the profile vector, the personalization component determines a cosine of an angle between the content vectors and the profile vector to correlate the content vectors and the profile vector, the personalization component adjusts ordering of the personalized set to an adjusted personalized set in response to a user-selected parameter that specifies a degree to which the profile vector affects the personalized set;
    a preference modeling component that generates the profile vector based on metadata related to content with which a user previously interacted,
    the preference modeling component generating the profile vector by averaging content vectors associated with the content with which the user previously interacted to generate the profile vector, the preference modeling component effectuates vector averaging by evaluating $$\vec{P}_u = \frac{\sum_{\vec{a} \in A_u} \vec{a}}{|A_u|},$$

where $\vec{P}_u$ is the profile vector and $A_u$ is content with which the user previously interacted; and a presentation component that provides a user interface to facilitate interaction between the user and any component coupled to the personalization component, the user interface comprising a display component for receiving a query for available content, as well as an interactive display component for receiving a user-selected parameter that specifies a degree to which the profile vector affects the personalized set, and that displays the adjusted personalized set.

2. The system of claim 1, further comprising a content modeling component that generates the content vectors based on metadata related to the available content.

3. The system of claim 1, the preference modeling component generates the profile vector by adding content vectors associated with the content with which the user previously interacted to generate the profile vector.

4. The system of claim 3, the preference modeling component effectuates vector addition by evaluating $\vec{P}_u = \Sigma_{\vec{a} \in A_u} \vec{a}$, where $\vec{P}_u$ is the profile vector and $A_u$ is content with which the user previously interacted.

5. The system of claim 1, further comprising a weighting component that provides a weight related to a type of user action, the weight is employed in connection with generating the profile vector.

6. The system of claim 1, further comprising a profile adaptation component that controls a rate that the profile vector adapts to variations in attributes associated with the content interacted with by a user by providing a weight related to content with which the user previously interacted as a function of time, where the weight is employed in connection with iteratively generating the profile vector.

7. The system of claim 6, during an iteration the profile vector is adaptively generated by evaluating $\vec{P}_i = \alpha \vec{P}_{i-1} + \beta \vec{x}$, where $\vec{P}_i$ is the profile vector generated during the iteration, $\vec{P}_{i-1}$ is a previous profile vector based on previous user actions, $\alpha$ is an adapting rate that controls how quickly the previous profile vector adapts, $\vec{x}$ is a current profile vector based on recent user actions, and $\beta$ is a weighting factor identifying an importance of the current profile vector.

8. The system of claim 1, the personalization component correlates a content vector and the profile vector to determine a similarity by evaluating $$sim(i, j) = \cos(\vec{i}, \vec{j}) = \frac{\vec{i} \cdot \vec{j}}{\|\vec{i}\|_2 \times \|\vec{j}\|_2} = \frac{\sum_{m \in M}(S_{m,i} \cdot S_{m,j})}{\sqrt{\sum_{m \in M} S_{m,i}} \cdot \sqrt{\sum_{m \in M} S_{m,j}}},$$

where $\vec{i}$ is the content vector, $\vec{j}$ is the profile vector, m is an attribute in a set of possible attributes M, $S_{m,i}$ is a magnitude of attribute m in the content vector, and $S_{m,j}$ is a magnitude of attribute m in the profile vector.

9. The system of claim 1, further comprising a control component that provides a user selectable degree to which the personalization component utilizes the user preference for generating the personalized set of available content.

10. The system of claim 1, the personalized set of available content is at least one of a set of search results and a set of headlines.

11. The system of claim 1, further comprising a user history component that continuously monitors user behavior and logs information associated with a user action.

12. The system of claim 1, the preference modeling component dynamically modifies the profile vector based on changes in user activity.

13. The system recited in claim 1, wherein the interactive display component for receiving the user-selected parameter that specifies the degree to which the profile vector affects the personalized set and that displays the adjusted personalized set comprises:
  a slide bar having a display object that is movable from one side of the slide bar to an opposing side of the slide bar for adjusting the degree to which the profile vector affects a balance between relevance related to the content vectors and inferred relevance related to the profile vector.

14. A computer-implemented method of personalizing information provided to a user, comprising:
  receiving, at a user interface, a query for available content;
  generating a plurality content vectors of available content relevant to the query, the content vectors are based upon metadata associated with the available content, the content vectors are high-dimensional vectors generated based upon associated metadata that describes at least one category related to the available content such that each vector dimension corresponds to a metadata category;
  generating a profile vector representing user preferences, generating the profile vector based on metadata related to content with which a user previously interacted by averaging content vectors associated with the content with which the user previously interacted to generate the profile vector, the preference modeling component effectuates vector averaging by evaluating $$\vec{P}_u = \frac{\sum_{\vec{a} \in A_u} \vec{a}}{|A_u|},$$

where $\vec{P}_u$ is the profile vector and $A_u$ is content with which the user previously interacted, the profile vector is provided in a same high-dimensional vector space as the content vectors and is based at least in part on content vectors associated with content the user has interacted with previously;
  correlating the content vectors and the profile vector by evaluating a cosine of an angle formed between the content vectors and the profile vector and inferring a relevance of available content, inferred relevance is a function of the correlation between the content vectors and the profile vector such that an increase in correlation maps to an increase in relevance;
  receiving, at the user interface, a user-selected parameter specifying a degree of inferred relevance to be employed, thereby enabling the user to choose a balance between relevance related to the content vectors and inferred relevance related to the profile vector;
  adjusting the inferred relevance in response to the user-selected parameter, thereby adjusting the available content provided to the user to an adjusted order in which the available content is presented to the user based on the choice between relevance related to the content vectors and inferred relevance related to the profile vector; and
  displaying, at the user interface, the available content in the adjusted order.

15. The method of claim 14, further comprising modeling a degree of interest of a user for the available content.

16. The method of claim 14, further comprising providing an output of available content based at least in part on a degree of personalization.

17. The method of claim 14, further comprising weighting data associated with the profile vector as a function of time.

18. The method of claim 14, further comprising updating the profile vector based on recent user actions.

19. The method of claim 14, generating the profile vector further comprises at least one of adding and averaging content vectors associated with content interacted with by a user.

20. The method recited in claim 14, wherein the method further includes displaying search results corresponding to the available content with indicators that reflect an ordering of the search results based on relevance to the content vectors and which are sorted and displayed in the adjusted order based on the inferred relevance to the profile vector.

* * * * *

UNITED STATES PATENT AND TRADEMARK OFFICE
CERTIFICATE OF CORRECTION

| | | |
|---|---|---|
| PATENT NO. | : 7,664,746 B2 | Page 1 of 1 |
| APPLICATION NO. | : 11/274536 | |
| DATED | : February 16, 2010 | |
| INVENTOR(S) | : Rangan Majumder | |

It is certified that error appears in the above-identified patent and that said Letters Patent is hereby corrected as shown below:

In Drawing Sheet 1 of 14, FIG. 1, line 1, above "PERSONALIZED" insert -- 100 --.

In Drawing Sheet 2 of 14, FIG. 2, line 1, above "PERSONALIZED" insert -- 200 --.

In Drawing Sheet 4 of 14, FIG. 4, line 1, above "PERSONALIZED" insert -- 400 --.

In Drawing Sheet 5 of 14, FIG. 5, line 1, above "PERSONALIZED" insert -- 500 --.

In Drawing Sheet 6 of 14, FIG. 6, line 1, above "PERSONALIZED" insert -- 600 --.

In Drawing Sheet 7 of 14, FIG. 7, line 1, above "PERSONALIZED" insert -- 700 --.

In Drawing Sheet 8 of 14, FIG. 8, line 1, above "802" insert -- 800 --.

In Drawing Sheet 9 of 14, FIG. 9, line 1, above "902" insert -- 900 --.

In Drawing Sheet 10 of 14, FIG. 10, line 1, above "search" insert -- 1000 --.

In Drawing Sheet 11 of 14, FIG. 11, line 1, above "search" insert -- 11000 --.

In Drawing Sheet 12 of 14, FIG. 12, line 1, above "search" insert -- 12000 --.

In Drawing Sheet 13 of 14, FIG. 13, line 1, above "1310" insert -- 13000 --.

In Drawing Sheet 14 of 14, FIG. 14, line 1, above "1428" insert -- 14000 --.

In column 6, line 9, after "document," Insert -- ...). --.

In column 18, line 57, in Claim 8, delete "is the content" and insert -- is a content --, therefor.

Signed and Sealed this
Seventh Day of June, 2011

David J. Kappos
*Director of the United States Patent and Trademark Office*